United States Patent

[11] 3,619,063

[72] Inventors Armand Hadni
Nancy;
Robert Thomas, Saint-Die; Jacques Weber, Verdun, all of France
[21] Appl. No. 761,997
[22] Filed Sept. 24, 1968
[45] Patented Nov. 9, 1971
[73] Assignee Centre National De La Recherche Scientifique
Paris, France
[32] Priority Sept. 29, 1967
[33] France
[31] 122823

[54] SPECTROMETER FOR THE FAR INFRARED
6 Claims, 9 Drawing Figs.
[52] U.S. Cl. ............................................. 356/106
[51] Int. Cl. ............................................. G01b 9/02
[50] Field of Search ................................. 356/106, 106 IS; 250/219 IA; 346/138

[56] References Cited
UNITED STATES PATENTS
2,493,534   1/1950   Hawkins .............. 250/219 UX
3,023,664   3/1962   Coleman et al. .............. 346/138 X OTHER REFERENCES
Review of Scientific Instruments, Vol. 32, No. 10, Oct., 1961. p. 1163.
Strong, J. D., et al., " Modulation Interferentielle et Calculateur Analogue Pour un Spectrometre Interferentiel," Le Journal de Physique et le Radium, March, 1958, pp. 192– 196.
Gebbie, H. A. " Submillimeter Wave Spectroscopy Using a Michelson Interferometer," From Advances in Quantum Electronics, Edited by J. R. Singer, Columbia University Press, 1961, pp. 156– 163. QC 447 c56.

*Primary Examiner*—William L. Sikes
*Assistant Examiner*—T. Major
*Attorney*—William D. Stokes

ABSTRACT: The spectrometer comprises a Michelson interferometer, recording means, reading means and a wave analyzer. The recording means produce on a support an area of aspect different from the aspect of the support, this area having a contour which reproduces the interferogram supplied by the interferometer. The reading means deliver, for each reading of the support, a signal representative of the transverse dimension of a part of the area whose variations reproduce the variations of the interferogram.

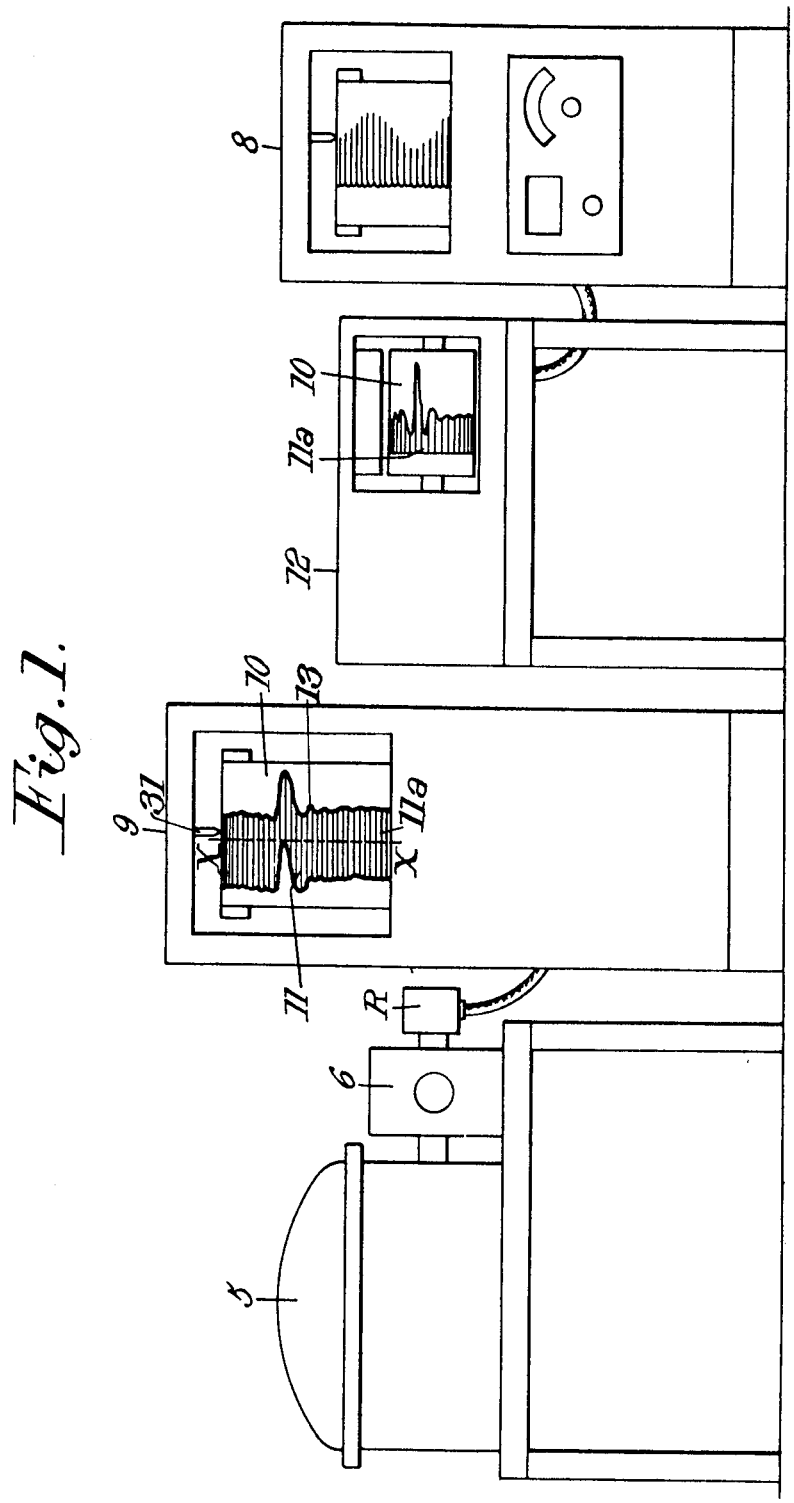

PATENTED NOV 9 1971 3,619,063
SHEET 2 OF 4
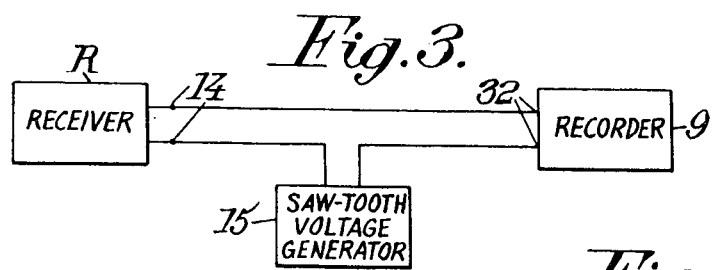
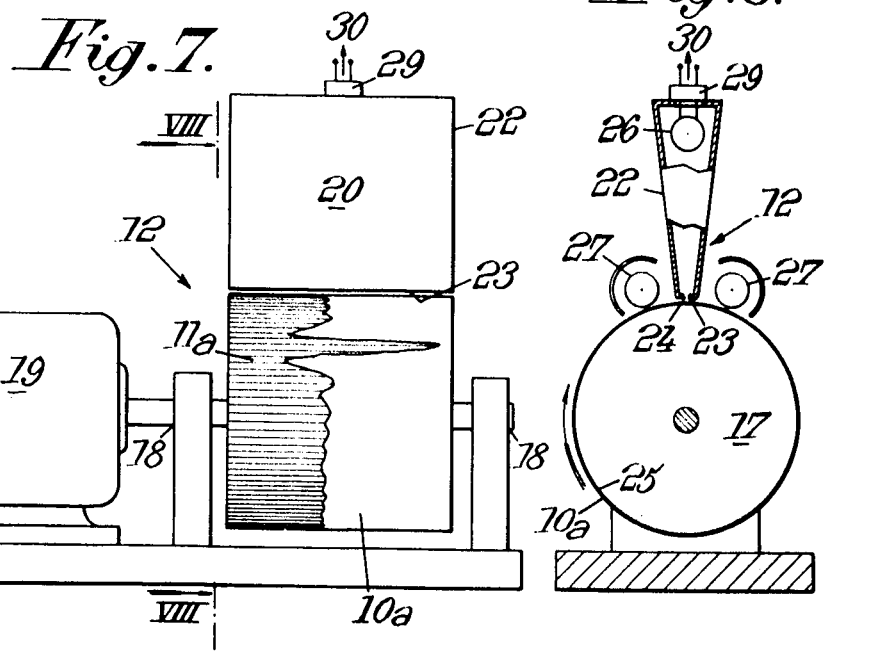
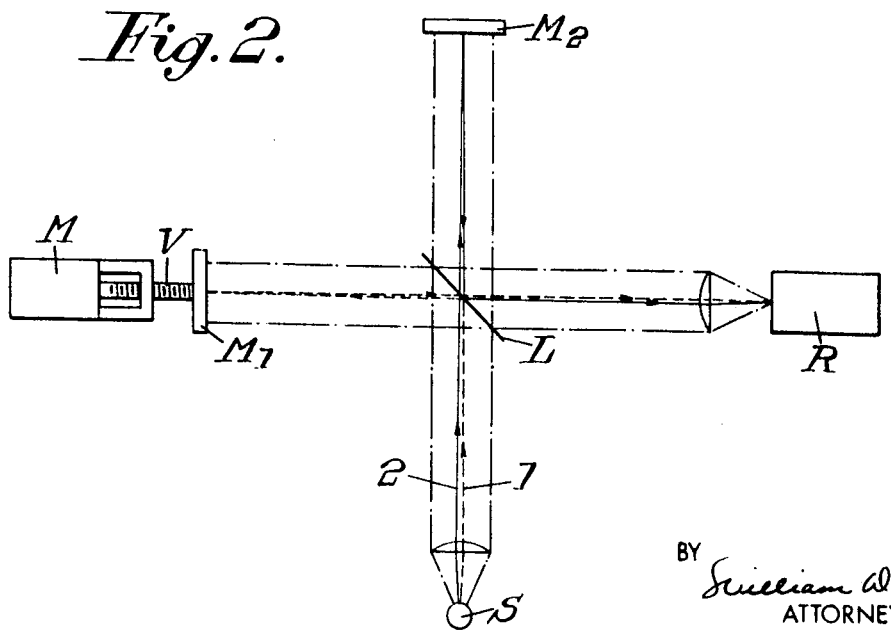
BY *William A. Stokes*
ATTORNEY 3,619,063

1

SPECTROMETER FOR THE FAR INFRARED

This invention relates to spectrometers of the type intended for the study of the far infrared, that is to say of submillimetric radiation whose wave lengths are comprised between 50 and 1,000 μ.

It is known that spectroscopy in the far infrared has been handicapped from its origins by the lack of brilliant sources and of sensitive receivers. This problem is resolved in a known manner by a better use of the spectral energy of the source thanks to an interferometer such as the Michelson interferometer which, in order to produce an interference phenomenon, divides the light coming from the source into two beams, and sends these two beams which contain practically all the energy of the source to a single point where the receiver is disposed. Thus, all of the spectral energy of the source is transmitted to the receiver, which is not the case with a spectrometer applying the principle of diffraction by a diffraction grating, the different frequencies then corresponding to beams separated in space, which must be analyzed one by one.

In order to specify the problems posed by the use of a Michelson interferometer, such an interferometer—shown schematically in FIG. 2—will now be succinctly described. It comprises a source S, a received R, a fixed mirror $M_2$, a semireflecting plate L and a mirror $M_1$ which can be displaced along a direction normal to its reflecting surface by the action of a micrometric screw V driven in an appropriate manner by a motor M. Assuming that the source S is monochromatic, it can be seen that, in accordance with the known properties of the semireflecting plate L, a ray coming from the source S can follow the paths 1 or 2, indicated respectively in dashed lines and in solid lines, before reaching the receiver R.

When the mirror $M_1$ effects its movement of translation, the difference of length between the two paths 1 and 2 varies and there is thus produced at the level of the receiver R an interference phenomenon between the beams which follow the paths 1 and 2. These beams generate a luminous flux on the receiver R which measures the intensity and the frequency of this flux and supplies an electric signal (called flux signal in the rest of this text) of the same frequency as the frequency of the modulation of the flux and whose amplitude is proportional to the intensity of the flux.

If λ is the wave length of the radiation emitted by the source S, and $v$ the speed of displacement of the mirror $M_1$, the period of the luminous flux received by the receiver R will be, as shown by a simple calculation, $T=\lambda/2v$; this period is thus, regardless of the value of λ, proportional to the period of the radiation which is $T_R=\lambda/c$ ($c$ = the speed of light). The intensity of the luminous flux will be itself proportional to the brightness of the source S for the radiation λ considered.

When the source S is polychromatic, the radiation of each frequency that it emits generates a luminous flux on the receiver R during the displacement of the mirror $M_1$, the intensities and the frequencies of modulation of these fluxes being respectively proportional to the brightnesses of the source S for the different radiation frequencies that it emits and to these frequencies. The superposition of the flux signals corresponding to the fluxes received and measured during the displacement of the mirror $M_1$ by the receiver R creates what is called in the rest of the text an interferogram whose analysis permits the determination of the brightness of the source S corresponding to each frequency of the radiation that it emits, which constitutes the emission spectrum of the source S. Needless to say, if the radiation emitted by the source S passed first through a sample substance disposed in a measuring chamber (not shown) before reaching the receiver R, the analysis of the interferogram supplied by this receiver would constitute an absorption spectrum.

One method of analysis of interferograms uses the Fourier transformation. Each point of the spectrum must be calculated and it is thus necessary to have a calculator available, which renders this method expensive and not very practical.

2

Another method would be to record the interferogram on a magnetic tape and to analyze the interferogram, repeated with an appropriate frequency, by a wave analyzer. However, the speeds of recording and of reading of the tape differ so much that this method is difficult to apply. Indeed, in view of the low energy of the waves in the far infrared, the interferogram is recorded at a very low speed (this recording can last an hour for example) and, in order to analyze conveniently this interferogram in a few minutes, the wave analyzer must read it at least 20 times per second. In these conditions, the ratio of the speeds of recording and of reading is about 72,000. Furthermore, the tape on which the interferogram is recorded must have, for technical reasons, a length such that its driven speed becomes considerable if it is passed 20 times per second across a reading head.

The chief object of this invention is to provide, for use in combination with an interferometer adapted to supply an interferogram and a wave analyzer adapted to analyze a periodic signal, an assembly formed of recording means adapted to record the interferogram and of reading means adapted to read repetitively this recording, the assembly being such that the spectrometers thus constituted fulfill the requirements of practice.

The invention comprises, principally, the provision, for the assembly mentioned above, of recording means adapted to produce on a support a modified area or an area of aspect different from the aspect of the support and of which a part of the contour reproduces the curve representing the complete interferogram and of reading means adapted to deliver, for each reading of the moving support, a signal representative of the dimension transverse with respect to the movement of the support of a part of the modified area having a transverse dimension whose variations reproduce the variations of the amplitude of the interferogram.

In any case, the invention will be well understood from the following complementary description as well as from the accompanying drawings, which complementary description and drawings are, of course, given merely by way of example.

In these drawings:

FIG. 1 represents schematically a spectrometer according to the invention;

FIG. 2 represents schematically a Michelson interferometer used in this spectrometer;

FIG. 3 shows a device forming part of this spectrometer;

FIG. 7 shows schematically an embodiment of the reading means forming part of the spectrometer;

FIG. 8 shows schematically, in section along VIII—VIII of FIG. 7, these same reading means.

Figure 4:
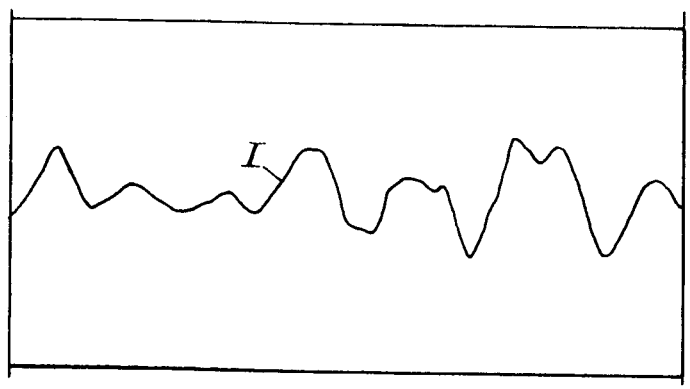
FIGS. 4, 5 and 6 illustrate the use of the device of FIG. 3.

The spectrometer which will now be described is intended for the study of a source emitting radiation in the far infrared.

With regard to the spectrometer as a whole, it comprises (FIG. 1) an interferometer 5 (such as a Michelson interferometer) whose receiver R (such as a pyroelectric receiver described in the Journal de Physique, tome 26, June 1965, p. 345) is adapted to supply an electric signal constituting the interferogram of a source S of radiation, this radiation coming to the receiver R either directly or through a measuring chamber 6 adapted to receive a substance whose properties in the far infrared are to be studied. The spectrometer further comprises an assembly formed of recording means adapted to record the interferogram and of reading means adapted to read repetitively the recording. The spectrometer comprises in addition a wave analyzer 8 adapted to analyze the repetitive signal supplied by the reading means mentioned above in order to extract from this signal components which each correspond in amplitude and in frequency to radiation of a given frequency emitted by the source S.

According to this invention, there are provided, for the assembly mentioned above, recording means 9 producing on a support 10 a modified area or area 11 of aspect different from the aspect of the support 10 and of which a part 13 of the contour reproduces the curve representing the complete interferogram and reading means 12 delivering, for each reading of the moving support 10, a signal representative of the dimension transverse with respect to the movement of the support 10 of a part 11a of the modified area 11 having a transverse dimension whose variations reproduce the variations of the amplitude of the interferogram.

For example, the recording means 9 comprise a conventional pen recorder in which can advance a support 10 constituted by a band and with which are associated means adapted to superimpose a periodic signal on the interferogram coming from the receiver R thus forming a resultant signal which is sent to the recorder 9 and which serves to make the pen 31 trace on the band 10 the modified area or area 11 of different aspect, the amplitude of the periodic signal being greater than the maximum amplitude of the interferogram and the frequency of this periodic signal being sufficient to ensure a saturated darkening of the area 11 when the band 10 advances in the recorder 9.

The means for superimposing a periodic signal on the interferogram advantageously comprise a sawtooth voltage generator 15 (FIG. 3) which is connected in series between the output 14 of the receiver R and the input 32 of the pen recorder 9.

Figure 5:
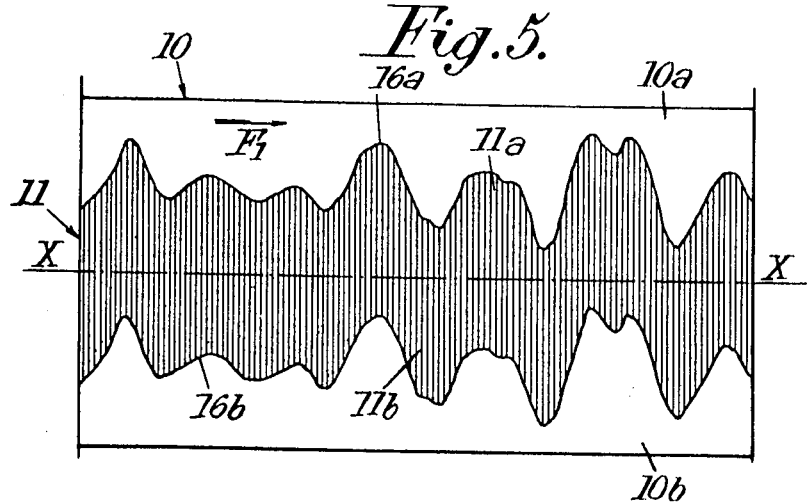

If a signal I (FIG. 4) is present at the output 14 of the receiver R, the resultant signal which is present at the input 32 of the recorder 9 is represented on a band 10 advancing in the recorder 9, in the manner which is shown in FIG. 5. The total darkened area 11 which is disposed on the band 10 is comprised between two lines 16a and 16b each reproducing the signal I, and the distance (measured along a direction perpendicular to the direction of the arrow $F_1$ which indicates the direction of movement of the band 10 in the recorder 9) between these two lines 16a and 16b is equal at each instant to the amplitude of the sawtooth voltage.

It is seen that a partial darkened area 11a bounded on the band 10 by the line 16a and by a line X—X (in dashed lines) passing, parallel to the direction $F_1$, through the darkened area 11 so that it does not in any case pass through a nondarkened surface of the band 10, has a dimension transverse with respect to the direction $F_1$ whose variations reproduce the variations of the amplitude of the signal I.

When the signal I is constituted by the interferogram supplied by the receiver R, the part 10a of the band 10 which is bounded by a line X—X receives a darkened area 11a (FIG. 6) bounded by the line X—X and by a line 16a similar to the interferogram, the variations of the transverse dimension of this darkened area 11a, transverse with respect to the direction of displacement $F_1$ of the band 10, reproducing the variations of the amplitude of the interferogram.

Figure 6:
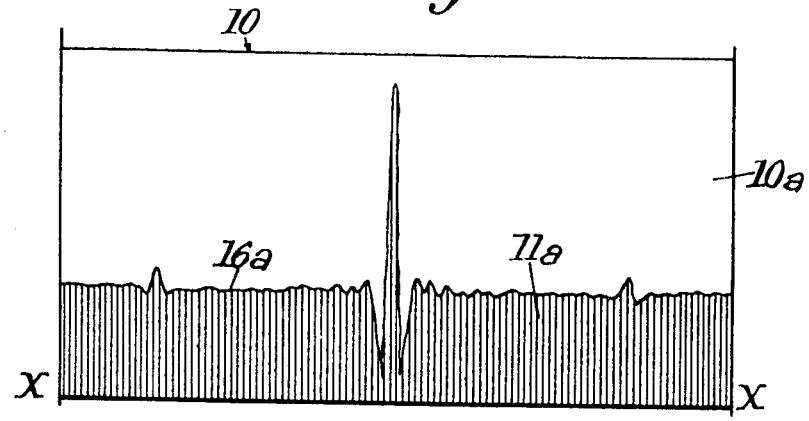

Next, with regard to reading means 12, one embodiment of these reading means 12 is shown schematically in FIGS. 7 and 8. These means 12 advantageously comprise a rotary drum 17 mounted on bearings 18, and driven by a motor 19 which can advantageously be a synchronous electric motor. The reading means 12 further comprise a reading member 20 constituted by a closed casing 22 having a face 23 which is nevertheless provided with a slot 24, this casing 22 containing a photoelectric cell 26. The casing 22 is disposed with respect to the drum 17, so that its face 23 is very near to the peripheral surface 25 of the drum 17 and so that the slot 24 is directed along a direction parallel to the axis of rotation of the drum 17. The peripheral surface 25 is such that it can receive the part 10a of the band 10 which is represented in FIG. 6, so that this part 10a covers advantageously all the peripheral surface 25 and so that its width is substantially equal to the length of the slot 24.

The photoelectric cell 26 is advantageously placed in a part of the casing 22 remote from the face 23 and from the slot 24 of the casing. On opposite sides of the casing 22, near to the slot 24 and parallel to the axis of rotation of the drum 17, are disposed lamps 27 intended to light the part 10a of the band 10 at the moment when it passes under the slot 24.

The photoelectric cell 26 measures at each instant the quantity of light reflected by the part 10a of the band 10 passing in front of the slot 24 of the casing 22. This quantity of light is in direct relation with the width of the darkened area 11a, present under the slot 24, at the instant considered and the photoelectric cell 26 thus supplies at each revolution of the drum 17, an electric signal whose variations reproduce the variations of the amplitude of the interferogram supplied by the receiver R.

Since the drum 17 is driven with a uniform rotation movement, this signal is repeated with a constant frequency equal to the frequency of rotation of the drum 17 and is advantageously sent into an amplifier 29 which thus delivers a periodic voltage 30.

A variant (not shown) of the system described above uses the two bands 10a and 10b that can be obtained by cutting the single band 10 supplied by the recorder 9, along a line X—X (FIG. 5). To each band 10a or 10b corresponds a casing 22 provided with a slot 24 and containing a photoelectric cell 26. A rotary drum 17 advantageously carries on its peripheral surface the two bands 10a and 10b disposed one beside the other. The two photoelectric cells 26 deliver two voltages in phase opposition which are applied to the inputs of a differential amplifier whose output supplies, at each revolution of the drum 17, a voltage having the shape of the interferogram, independently of any inequalities of darkening which the darkened areas 11a and 11b of the bands 10a and 10b might present.

Figure 9:
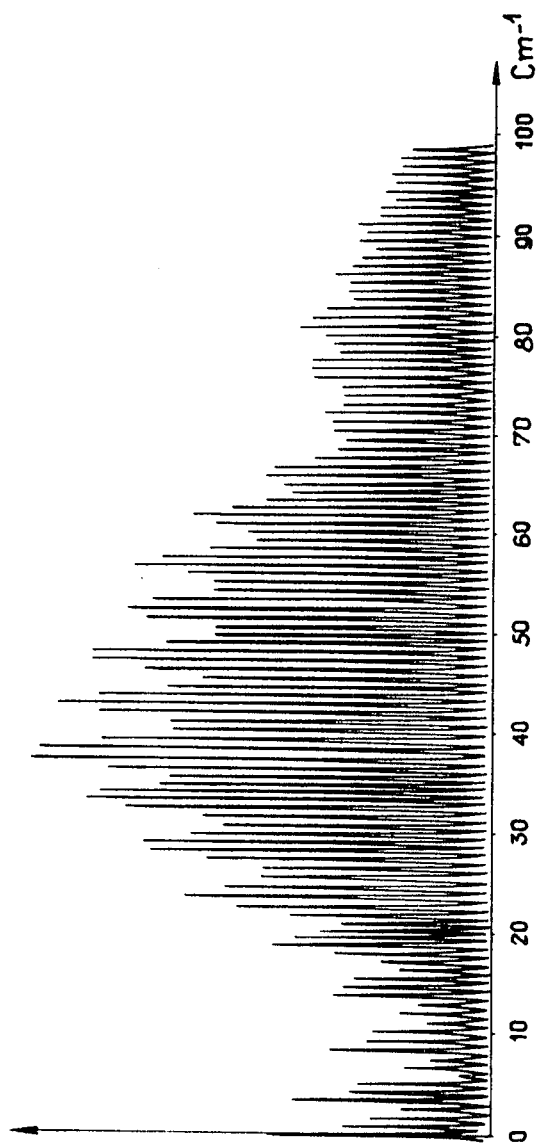
FIG. 9 shows an example of a spectrum supplied by the spectrometer according to the invention.

The periodic voltage 30 supplied by the reading device 12 thus reproduces the interferogram repeated at a given frequency, depending on the speed of rotation of the drum 17. This periodic voltage 30 is sent to a wave analyzer 8 whose function is to extract the flux signals which constitute the components of this periodic voltage and which each correspond to a flux received by the receiver R. Since each of these fluxes corresponds to radiation of a given frequency coming through the Michelson interferometer 5 from the source S, either directly, or after having passed through a substance introduced into the measuring chamber 6, it is seen that the wave analyzer 8 determines from the periodic voltage the spectrum sought, such as the one which is shown in FIG. 9, the wave lengths of the radiation of the various frequencies being shown on the abscissa (in number of waves per centimeter) and the corresponding brightnesses being shown on the ordinate.

The scales employed in this latter figure depend on the speed of displacement of the movable mirror $M_1$, on the speeds of advance of the band 10 during recording and reading and on the sensitivity of the receiver R. The movements of the mirror $M_1$ and of the band 10 in the recorder 9 and in the reading means 12 are advantageously controlled by synchronous motors which possess a high regularity of operation. Similarly, the exploration by the wave analyzer 8 of the periodic voltage 30 coming from the reading device can advantageously be controlled by a synchronous motor.

The operation of a spectrometer according to this invention is sufficiently apparent from the foregoing that no further explanation is necessary in this connection.

This spectrometer presents numerous advantages:
the cost price is relatively low;
the recording is slow and the reading is very rapid for it only depends on the speed of rotation of the drum 17;
the rapid reading permits the spectrum sought to be obtained in times much shorter than those which are usually required by spectrometers for infrared;
the limit of resolution is less than 1 cm.[11];
the use of a pyroelectric receiver renders the spectrometer robust and reliable.

Many variants or modified versions of the particular spectrometer described are possible. In one such variant, the darkening system described above is applied not to a band but to a disc fixed on a plate making one revolution during the duration of recording of the interferogram, the pen of the recorder then moving along a radial direction. For the reading, the disc transported to another plate turning at high speed is lit and excites by reflection a photoelectric cell.

In another variant of the spectrometer, the reading is no longer realized by reflection of the light on a band or a disc, but by transmission of the light through this disc or band, the light source and the photoelectric cell being placed respectively on opposite sides of the support used.

A variant of the darkening system to form the modified area uses a photographic emulsion disposed on a support in the form of a band or disc, the variable height darkening being produced, for example, by forming on the emulsion the image of a luminous slot whose height varies in the same manner as the intensity of the interferogram, the reading being done by reflection, as described above, or by transmission if the support is transparent.

In view of the numerous variants and modifications possible without departing from the spirit or the scope of this invention, the invention should not be limited to the particular embodiment described.

What we claim is:

1. An interferometric spectrometer assembly including an interferometer and a wave analyzer for analyzing a periodic series of electrical signals and for extracting components from said signals, said assembly comprising a receiver arranged to convert the infrared interferogram produced in said interferometer to an electrical signal proportional to the intensity of the interferogram, means for displacing a recording surface at a first regular speed, recording means arranged to record a modified variable area on said surface, said recording means including means for forming on said surface the image of a luminous slot which height varies in the same manner as the amplitude of the interferogram and means for adding a periodic signal to the interferogram thus forming a resultant signal which is sent to the recorder and which serves to produce on the band said modified variable area, the amplitude of the periodic signal being greater than the maximum amplitude of the interferogram, the dimension of said variable area transverse to the displacing motion being proportional to the intensity of said last-mentioned electrical signal, means for rendering the period of the advancement of said surface equal to the duration of the transmission of the complete interferogram in the form of said electrical signal, reading means including a rotating drum and photosensitive means arranged to analyze periodically said transverse dimension of said area, means for displacing said reading means at a second regular speed much greater than said first regular speed, thereby supplying to said wave analyzer said periodic series of electrical signals each representative of said transverse dimension of a portion of the interferogram.

2. A spectrometer according to claim 1, wherein said reading means comprises a closed casing containing a photoelectric cell and provided on one of its faces with a slot, said casing being disposed so that its slot is very near to the peripheral surface of said rotary drum and so that its slot is parallel to the axis of rotation of said drum, and lighting means for lighting said part of said band when it passes in front of said slot, so that said photoelectric cell measures the quantity of light which is reflected by said band and whose variations reproduce the variations of the dimension of said modified area in a direction parallel to the axis of rotation of said drum.

3. A spectrometer according to claim 2, wherein the totality of said band which has come from said recorder is disposed on said rotary drum, and two reading members are provided for measuring respectively the dimensions of the modified areas which are disposed on the two parts of said band separated by said line, the signal supplied by said reading means being formed by the difference between the measurements effected by each of said reading members.

4. A spectrometer according to claim 1, wherein said recording means additionally comprise a pen-type recorder.

5. A spectrometer according to claim 1, wherein said means for adding the periodic signal to the interferogram comprise a sawtooth voltage generator connected in series between the output of said interferometer and the input of said recorder.

6. A spectrometer according to claim 1, wherein said reading means operates by transmission of the light through said surface which has come from said recorder, a source of light and a detector of light being respectively placed facing each other but on opposite sides of said surface.

* * * * *